US009766331B2

(12) United States Patent
Bilek et al.

(10) Patent No.: US 9,766,331 B2
(45) Date of Patent: Sep. 19, 2017

(54) SECTORIZED ANTENNAS FOR IMPROVED AIRBORNE RECEPTION OF SURVEILLANCE SIGNALS

(71) Applicant: Honeywell International Inc., Morristown, NJ (US)

(72) Inventors: Jan Bilek, Brno (CZ); Petr Kejik, Brno (CZ); Milan Sopata, Cana (SK)

(73) Assignee: Honeywell International Inc., Morris Plains, NJ (US)

( * ) Notice: Subject to any disclaimer, the term of this patent is extended or adjusted under 35 U.S.C. 154(b) by 353 days.

(21) Appl. No.: 14/572,422

(22) Filed: Dec. 16, 2014

(65) Prior Publication Data

US 2016/0170016 A1 Jun. 16, 2016

(51) Int. Cl.
*G01S 13/74* (2006.01)
*H01Q 1/28* (2006.01)
*H04B 7/0491* (2017.01)
*H04B 7/08* (2006.01)

(52) U.S. Cl.
CPC .............. *G01S 13/74* (2013.01); *H01Q 1/28* (2013.01); *H04B 7/0491* (2013.01); *H04B 7/0802* (2013.01)

(58) Field of Classification Search
CPC ........ G01S 13/74; H01Q 1/28; H04B 7/0491; H04B 7/0802
USPC ............................................................. 342/29
See application file for complete search history.

(56) References Cited

U.S. PATENT DOCUMENTS

| | | | |
|---|---|---|---|
| 5,490,165 A | 2/1996 | Blakeney, II et al. | |
| 5,819,182 A | 10/1998 | Gardner et al. | |
| 6,282,228 B1 * | 8/2001 | Monroe | H04B 1/707 327/164 |
| 6,792,058 B1 * | 9/2004 | Hershey | G01S 13/782 375/267 |
| 7,414,567 B2 | 8/2008 | Zhang et al. | |
| 7,876,259 B2 | 1/2011 | Schuchman | |
| 8,063,816 B2 | 11/2011 | Troxel | |
| 8,072,374 B2 | 12/2011 | Hovey | |
| 8,130,135 B2 | 3/2012 | Donovan | |
| 8,229,605 B2 | 7/2012 | Vlad | |
| 8,462,041 B2 | 6/2013 | Hampel et al. | |
| 8,643,534 B2 | 2/2014 | Margolin | |
| 2001/0033600 A1 * | 10/2001 | Yang | H01Q 1/246 375/130 |
| 2008/0174472 A1 | 7/2008 | Stone et al. | |

(Continued)

FOREIGN PATENT DOCUMENTS

WO 2010129646 A1 11/2010

OTHER PUBLICATIONS

Response to the Extended Search Report dated Mar. 11, 2016, from counterpart European Application No. 15198548.8, filed Jun. 23, 2016, 16 pp.

(Continued)

*Primary Examiner* — Timothy A Brainard

(74) *Attorney, Agent, or Firm* — Shumaker & Sieffert, P.A.

(57) ABSTRACT

A plurality of antenna elements may receive a plurality of signals. Each of the plurality of antenna elements may correspond to at least one of a plurality of sectors of a sectorized antenna. A receiver may process each of the plurality of signals in parallel, including decoding one or more messages from the plurality of signals. The receiver may output at least one of the one or more messages.

6 Claims, 9 Drawing Sheets

(56) References Cited

U.S. PATENT DOCUMENTS

| | | | |
|---|---|---|---|
| 2009/0318153 A1* | 12/2009 | Maheshwari | H04L 1/189 |
| | | | 455/436 |
| 2010/0253565 A1 | 10/2010 | Piesinger | |
| 2011/0169684 A1 | 7/2011 | Margolin | |
| 2011/0215960 A1 | 9/2011 | Stevens et al. | |
| 2011/0215963 A1 | 9/2011 | Perl | |
| 2012/0092211 A1* | 4/2012 | Hampel | G01S 3/74 |
| | | | 342/175 |
| 2013/0015998 A1* | 1/2013 | Jones | G01S 13/9303 |
| | | | 342/30 |
| 2013/0082867 A1 | 4/2013 | Malaga | |
| 2013/0121219 A1 | 5/2013 | Stayton | |

OTHER PUBLICATIONS

Extended Search Report from counterpart European Application No. 15198548.8, dated Mar. 11, 2016, 8 pp.

"ADS-B Decoder and Software with PIC18F2550," ADS-B Receiver, retrieved on Jul. 16, 2014, 10 pages.

"SESAR 9.21: ADS-B—1090 Higher Performance Study," Honeywell, ICAO ASP TSG, Jan. 2014, 30 pages.

Orlando et al., Aircraft Directional Antenna for Air-Air Reception of Extended Squitter, ASP TSG WP07-01, MIT Lincoln Laboratory, Jun. 22, 2009, 10 pages.

Johnsson, "Aeronautical Mobile Communications Panel," Agenda Item 8: Review of Results of the Subgroup of Nicolas Fistas, ICAO Standardised Systems Supporting ADS-B, Working Group M Third Meeting, Dec. 10-18, 2001, 10 pages.

* cited by examiner

SECTORIZED ANTENNAS FOR IMPROVED AIRBORNE RECEPTION OF SURVEILLANCE SIGNALS

TECHNICAL FIELD

The disclosure relates to airborne reception of surveillance messages via sectorized antennas.

BACKGROUND

Automatic dependent surveillance broadcast (ADS-B) is a technology where a particular aircraft can determine its position and report it (together with other data such as position data accuracy, aircraft identification, barometric altitude, and the like), thereby enabling other aircraft and air traffic control ground stations to be aware of the position of the particular aircraft. As a result, aircraft and ground stations equipped with ADS-B receiving devices may determine the positions of other aircraft that are equipped by ADS-B transmitting devices in their vicinity. Transmitting and receiving of ADS-B messages by aircraft may supplement or replace the use of ground-based radars that determine the positions of airborne aircraft to prevent airborne collisions.

SUMMARY

Devices, systems, and techniques for improving an aircraft's reception of ADS-B messages are described herein. In some examples, a sectorized antenna comprising a plurality of directional antenna elements may receive one or more signals carrying one or more ADS-B messages. A receiver operably coupled to the plurality of directional antenna elements may process the one or more signals to decode the one or more ADS-B messages. In one example, the sectorized antenna may receive a plurality of signals carrying a plurality of ADS-B messages. The receiver may process the plurality of signals in parallel, including decoding the plurality of ADS-B messages carried by the plurality of signals in parallel. In some examples, the sectorized antenna may be a traffic collision avoidance system (TCAS) antenna and the signal processor that processes the signals received by the antenna may be a part of modified TCAS unit. In this way, the sectorized antennas technique, as disclosed herein, may be implemented by reusing and modifying an already-installed TCAS unit included in an aircraft.

A conventional ADS-B receiver system may typically lose a number of ADS-B messages when they are received close enough to overlap, particularly in crowded air traffic conditions such as are increasingly common ear large airports. In accordance aspects of the present disclosure, the sectorized antennas technique disclosed herein may reduce the number of lost ADS-B messages due to overlapping signals, which may prevent a degradation of any applications that use ADS-B message data carried by the ADS-B messages, including, for example, applications involved in collision avoidance and situational awareness.

In one example, the disclosure is directed to a method. The method comprises receiving, by a plurality of antenna elements, a plurality of signals, wherein each of the plurality of antenna elements correspond to at least one of a plurality of sectors of a sectorized antenna. The method further comprises processing, by a receiver, each of the plurality of signals, including decoding one or more messages from the plurality of signals. The method further comprises outputting, by the receiver, at least one of the one or more messages.

In another example, the disclosure is directed to a system. The system comprises a plurality of antenna elements configured to receive a plurality of signals, wherein each of the plurality of antenna elements corresponds to at least one of a plurality of sectors of a sectorized antenna. The system further comprises a receiver configured to: process each of the plurality of signals in parallel, including decoding one or more messages from the plurality of signals; and output at least one of the one or more messages.

The details of one or inure examples are set forth in the accompanying drawings and the description below. Other features, objects, and advantages in addition to those described below will be apparent from the description and drawings, and from the claims.

DETAILED DESCRIPTION

Example devices, systems, and techniques for receiving and decoding surveillance messages are described in this disclosure. More specifically, the present disclosure describes example devices, systems, and techniques for an aircraft to improve reception of radio frequency (RF) signals that carry automatic dependent surveillance broadcast (ADS-B) messages that, among others, indicate the positions of one or more other neighboring aircraft.

In certain geographical areas where air traffic is very dense, two or more ADS-B messages may sometimes arrive at an antenna of an ADS-B receiving device at the same time and may therefore overlap. When the overlapping incident messages have significantly different power levels, the ADS-B receiving device may typically process only the message with the relatively strongest power level, thereby losing the messages with relatively weaker power levels. Thus, when the messages are overlapped, at least one message is processed. However, when the overlapping incident messages each have comparable power levels, each of the overlapped messages may be lost, thereby leading to decreased frequency-space utilization and consequently also a decreased ability of the system to assure performance measures such as availability required by applications utilizing ADS-B messages.

Examples of potential issues an aircraft may encounter with receiving and decoding ADS-B messages may include channel congestion (e.g., interference). An ADS-B channel may be shared by systems such as distance measuring equipment (DME) systems, traffic collision avoidance systems (TCAS), secondary surveillance radar (SSR) systems, and the like. Channel congestion may also occur due to high traffic density near large airports.

Figure 1A:
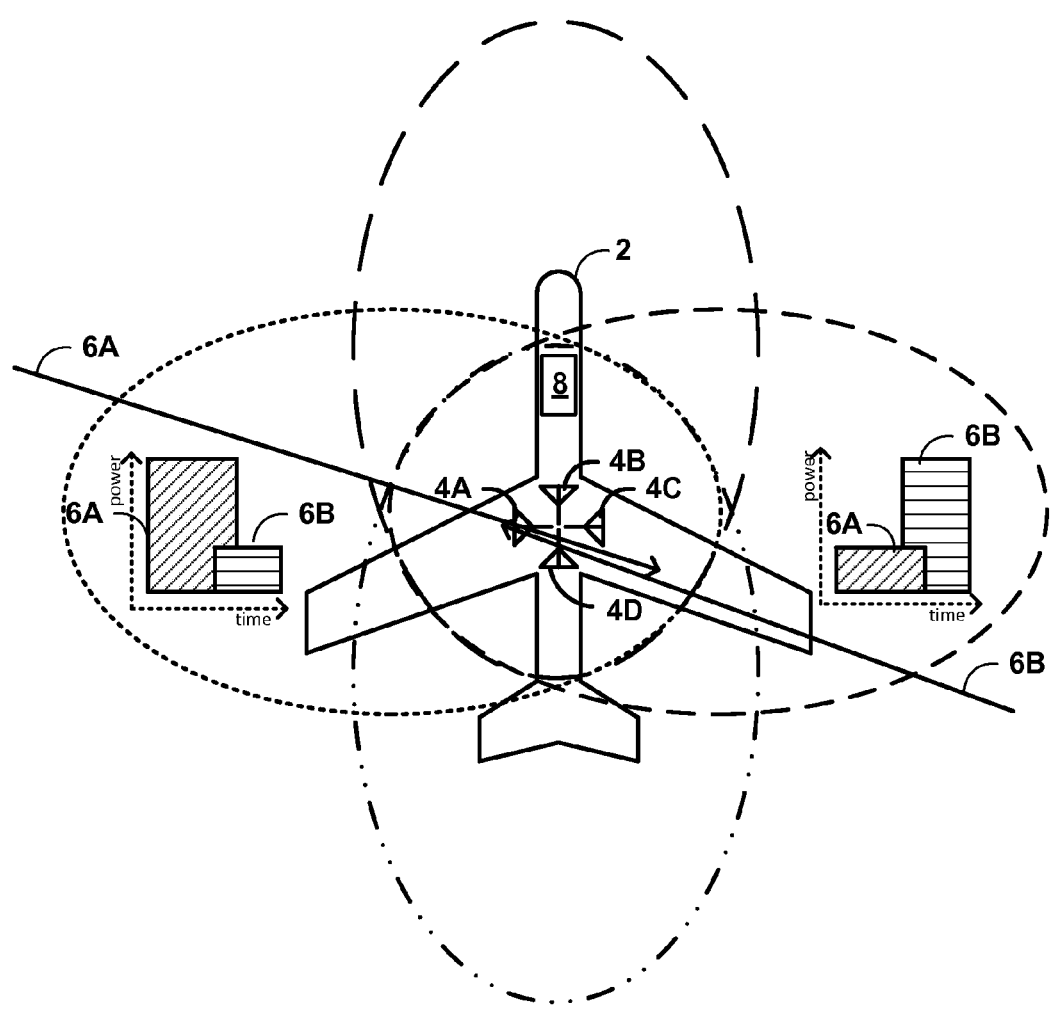
FIG. 1A is a functional block diagram illustrating an example aircraft 2 that includes antenna elements 4A-4D which are configured to receive signals indicative, among others, of the positions of other aircraft within a specified vicinity of the example aircraft's position.

FIG. 1A is a functional block diagram illustrating an example aircraft 2 that includes antenna elements 4A-4D ("antenna elements 4") which are configured to receive signals that carry ADS-B messages transmitted by aircraft within a specified vicinity of aircraft 2's position.

Antenna elements 4 may make up a sectorized antenna comprising a plurality of sectors, where each antenna element antenna element 4 may correspond to at least one of the plurality of sectors of the sectorized antenna. As such, each of antenna elements 4A-4D may be a directional antenna. A directional antenna may be an antenna that does not radiate and/or receive signals uniformly in all directions. However, a directional antenna may show a greater gain in one or more directions, thereby increasing its performance in transmitting and receiving signals in those one or more directions. Each of antenna elements 4A-4D may be positioned in aircraft 2 such that each of antenna elements 4A-4D may show greater gain in a substantially different direction with respect to the other antenna elements of antenna elements 4. In the example of FIG. 1A, because antenna elements 4 comprise four elements 4A-4D, antenna elements 4 may be a sectorized antenna having four sectors, and each of the four antenna elements 4A-4D may show greater gain in a substantially different direction with respect to the other of antenna elements 4A-4D. Although the example of FIG. 1A illustrates a sectorized antenna having four antenna elements 4A-4D, it should be understood that a sectorized antenna in accordance with techniques of the present disclosure may include greater or fewer than four antenna elements. As such, antenna elements 4 may comprise two or more antenna elements with various directional characteristics (radiation patterns).

Antenna elements 4 may be configured to receive analog radio frequency (RF) signals that carry ADS-B messages. In one example, antenna elements 4 may operate at ADS-B channel at 1090 MHz to receive signals carrying ADS-B messages that indicate, among others, the positions of one or more other neighboring aircraft.

As shown in FIG. 1A, one or more aircraft in the vicinity of aircraft 2 may broadcast RF signals 6A and 6B from differing directions. In some examples, RF signals 6A and 6B may at least partially overlap in time, such that two or more of antenna elements 4A-4D may be able to receive one or both of RF signals 6A and 6B. For example, both antenna element 4A and antenna element 4C may be able to receive both RF signals 6A and 6B. However, due to the directional nature of antenna elements 4 and due to RF signals 6A and 6B being broadcast from different directions, the composite RF signal (a combination of RF signals 6A and 6B) received by individual antenna elements 4A and 4C may differ (the power ratios between RF signals 6A and 6B), which may increase the probability that ADS-B messages carried by RF signals 6A and 6B respectively will be correctly decoded. In the example shown in FIG. 1A, RF signal 6A received by antenna element 4A is significantly more powerful than RF signal 6B received by antenna element 4A. Conversely, RF signal 6B received by antenna element 4C is significantly more powerful than RF signal 6A received by antenna element 4C. While the example of FIG. 1A shows antenna elements 4 receiving two RF signals 6A and 6B, antenna elements 4 may be able to receive fewer or more than two RF signals. For example, each of the four elements 4A-4D of antenna elements 4 may be able to receive one or more RF signals which may be the same as or different from RF signals received by other elements of antenna elements 4. In the example shown in FIG. 1A. RF signals 6A and 6B may each represent an ADS-B message, may respectively represent a single ADS-B message and an interfering signal, or may represent any other signal sharing the same RF channel.

Aircraft 2 may include receiver 8 which may be operably coupled to antenna elements 4. Receiver 8 may be configured to process one or more of the plurality of signals received by antenna elements 4, including decoding one or more ADS-B messages from the one or more of the plurality of signals. Receiver 8 may be further configured to output the one or more ADS-B messages that it has decoded. For example, receiver 8 may output the one or more ADS-B messages that it has decoded to the traffic computer (not depicted in FIG. 1A). Traffic computer may process ADS-B data (among other data inputs) and may output application specific data to a communication bus (not depicted in FIG. 1A).

Figure 1B:
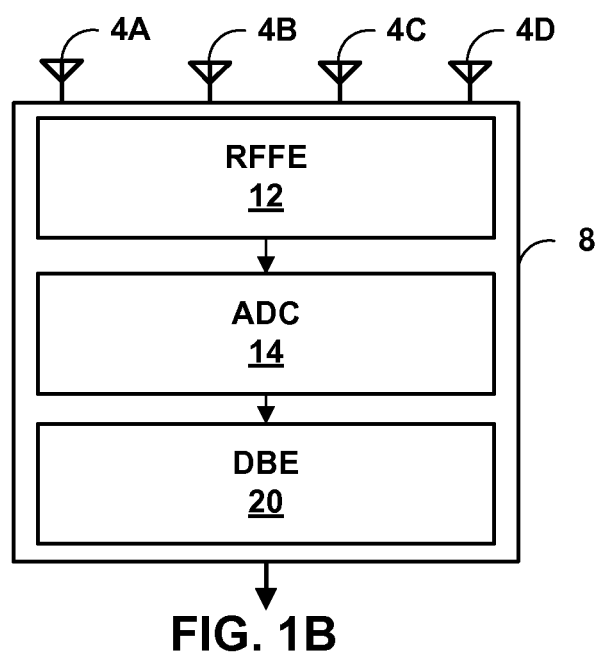
FIG. 1B is a functional block diagram illustrating an example receiver 8.

FIG. 1B is a functional block diagram illustrating an example receiver 8. As shown in FIG. 1B, receiver 8 may include radio frequency front-end (RFFE) 12, analog-to-digital converter (ADC) 14, and digital back-end (DBE) 20.

RFFE 12 may be operably coupled to antenna elements 4 and may process corresponding RF signal streams received from corresponding antenna elements 4A-4D to convert them into intermediate frequency (IF) signals. As discussed above, an antenna element of antenna elements 4 may receive an RF signal stream that may convey one or more ADS-B messages (corresponding RF signals), and RFFE 12 may be configured to select and process the RF signal streams received from one or more of antenna elements 4. In one example, RFFE 12 may select one RF signal stream received by one of antenna elements 4 out of all available RF signal streams received by all of antenna elements 4, based at least in part on the respective signal power levels of the received RF signal streams, such as selecting the RF signal stream received by one of antenna elements 4 with the highest signal power level (i.e., the strongest signal) out of all available RF signal streams received by that one of antenna elements 4.

In some examples, RFFE 12 may include a plurality of RFFEs, each of which corresponds with one of antenna elements 4, or may include a multi-channel RFFE, where each channel of the multi-channel RFFE corresponds with one of antenna elements 4. For example, if antenna elements 4 comprise four antenna elements 4A-4D, RFFE 12 may include four RFFEs or may include a four-channel RFFE. In this way, RFFE 12 may be able to process RF signal streams received from two or more antenna elements of antenna elements 4 in parallel, such that RFFE 12 may be able to process multiple RF signal streams from two or more antenna elements of antenna elements 4 at the same time instead of processing just a single RF signal stream. It should be understood that the term parallel as used throughout this disclosure should not necessarily indicate any precise overlap or perfect synchronization in processing multiple RF signal streams.

Thus, in the example of FIG. 1B, a first channel of RFFE 12 may correspond to antenna element 4A and a second channel of RFFE 12 may correspond to antenna element 4C. The first channel of RFFE 12 may process and convert the corresponding RF signal stream into an IF signal. Correspondingly, a second channel of RFFE 12, may process and convert the corresponding RF signal stream into an IF signal. The first and second channels of RFFE 12 may operate to process the RF signal streams from antenna elements 4A and 4C in parallel.

ADC 14 may be operably coupled to RFFE 12 and may convert analog intermediate frequency signals received from RFFE 12 to digital intermediate frequency signals, and may output the digital intermediate frequency signals to DBE 20. Similar to RFFE 12, ADC 14 may include a plurality of ADCs or may be a multi-channel ADC, such that each of the plurality of ADCs or each channel of the multi-channel ADC may process analog IF signals outputted by a corresponding channel of a multi-channel RFFE 12 or by one of a plurality of RFFEs of RFFE 12.

DBE 20 may be operably coupled to ADC 14 and may continuously attempt to detect and decode ADS-B messages contained in the digital signal streams outputted by ADC 14 in parallel. Detection and decoding may be performed, in one non-limiting example, in accordance with the DO-260B standard (or EUROCAE ED-102A, which is the European equivalent) promulgated by the Radio Technical Commission for Aeronautics (RTCA) and the Federal Aviation Administration (FAA). DBE 20 may include a plurality of DBEs or may be a multi-channel DBE. ADS-B message detection and decoding may be performed separately for each channel. As individual digital signal streams received by individual antenna elements 4 may differ (such as by amplitude of individual received ADS-B messages), the ADS-B message detection and decoding algorithm performed in all channels of DBE 20 may detect and decode various messages in each DBE channel.

DBE 20 may be operably coupled to ADC 14 and may be to decode one or more ADS-B messages contained in the digital signals outputted by ADC 14 in parallel. Decoding one or more ADS-B messages contained in the digital signals in parallel is not limited to starting decoding of multiple signals or outputting one or more ADS-B messages exactly at the same time. For example, if DBE 20 starts processing a first digital signal outputted by ADC 14 and, while processing the first digital signal, then starts to process a second digital signal outputted by ADC 14, DBE 20 may still be deemed to be processing the first and second digital signals in parallel, in that DBE 20 may be able to process more than one digital signal at the same time. The first signal may correspond, for example, to the RF signal 6A (depicted in FIG. 1A) received by antenna element 4A and the second signal may correspond, for example, to the RF signal 6B (depicted in FIG. 1A) received by antenna element 4C. As such, the term parallel should not necessarily indicate any precise overlap or perfect synchronization in processing multiple digital signals.

As discussed in further detail below, DBE 20 may process the digital IF signals outputted by ADC 14 to convert the digital IF signals into baseband signals and may also detect and decode ADS-B messages carried by the baseband signals. DBE 20 may output the decoded ADS-B message data to, for example, a traffic computer (not depicted in FIG. 1B). Similar to RITE 12 and ADC 14, DBE 20 may include a plurality of DBEs or may be a multi-channel DBE, such that each of the plurality of DBEs or each channel of the multi-channel DBE may process digital IF signals outputted by a corresponding channel of a multi-channel ADC 14 or by one of a plurality of ADCs of ADC 14.

The traffic computer of aircraft 2 may process ADS-B data (among other data inputs) outputted by receiver 8 and may output application specific data to a communication bus (not depicted in FIG. 1B). For example, the traffic computer may output positions of nearby aircraft to a communication bus. That data may be utilized either by an output device, such as a display device, which may be viewed by pilots of aircraft 2, or it may be processed by a software application, such as a collision avoidance application.

Figure 2:
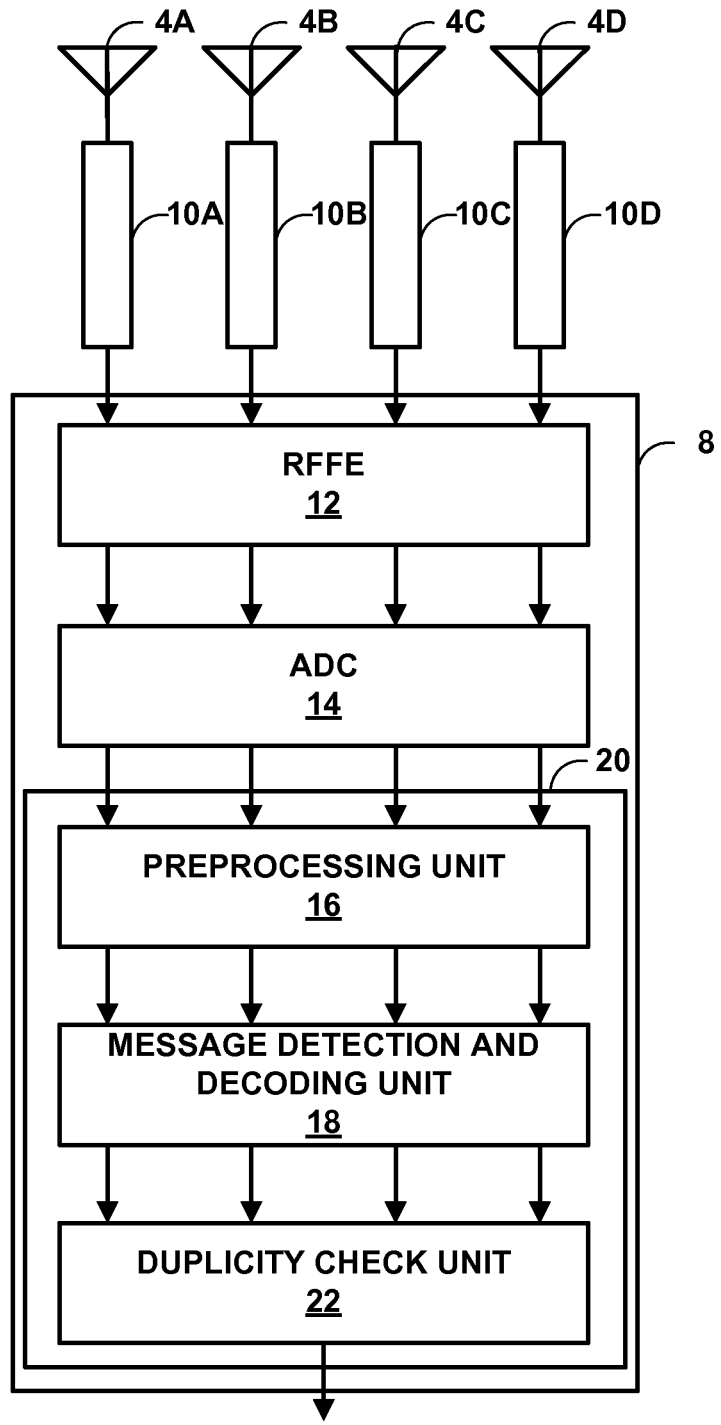
FIG. 2 is a functional block diagram illustrating an example receiver 8 for receiving and decoding a plurality of messages in parallel.

FIG. 2 is a functional block diagram illustrating an example receiver 8 for decoding a plurality of messages in parallel. Receiver 8 may include RFFE 12, ADC 14, and DBE 20. DBE 20 may include preprocessing unit 16, message detection and decoding unit 18, and duplicity check unit 22.

Receiver 8 may comprise any suitable arrangement of hardware, software, firmware, or any combination thereof, to perform the techniques attributed to receiver 8, RFFE 12, ADC 14, preprocessing unit 16, message detection and decoding unit 18, DBE 20, and duplicity check unit 22 herein. For example, receiver 8 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although RFFE 12, ADC 14, preprocessing unit 16, message detection and decoding unit 18, and duplicity check unit 22 are described as separate modules, in some examples, RFFE 12, ADC 14, preprocessing unit 16, message detection and decoding unit 18, and duplicity check unit 22 can be functionally integrated. For example, preprocessing unit 16, message detection and decoding unit 18, and duplicity check unit 22 may be implemented in the same hardware component. In some examples, RFFE 12, ADC 14, preprocessing unit 16, message detection and decoding unit 18, and duplicity check unit 22 may correspond to individual hardware units, such as ASICs, DSPs, FPGAs, or other hardware units, or one or more common hardware units.

Receiver 8 may, in the example of FIG. 2, be considered a parallel receiver because receiver 8 may fully process each of a plurality of RF signal streams received by receiver 8 from antenna elements 4 to decode one or more of the ADS-B messages carried by the RF signal streams in parallel. For example, preprocessing unit 16 may convert, in parallel, a plurality of digital representations of IF signals outputted by ADC 14 into a plurality of baseband signals, and message detection and decoding unit 18 may process the plurality of baseband signals outputted by preprocessing unit 16 in parallel to detect and decode ADS-B messages carried by the plurality of baseband signals. In this way, DBE 20 may be able to process two or more signals received from ADC 14 at the same time.

Antenna elements 4, in some examples, may comprise antenna elements of a TCAS antenna. Each element of antenna elements 4 may be a directional antenna element that corresponds to at least one of a plurality of sectors of a sectorized antenna. Each of antenna elements 4 may be operably coupled to RFFE 12 in receiver 8 via, for example, coaxial cables 10A-10D ("coaxial cables 10") or any other suitable means for connecting antenna elements 4 to RFFE 12.

RFFE 12 of receiver 8 may, as discussed above, be a multi-channel RFFE that is operably coupled to antenna elements 4 via, for example, coaxial cables 10. Each channel of RFFE 12 may be associated with a different antenna element of antenna element 4, and each channel of RFFE 12 may process and convert RF signal streams received from the associated antenna element of antenna elements 4 into intermediate frequency (IF) signals. For example, each channel of RFFE 12 may receive one RF signal stream from its associated antenna element of antenna elements 4, process and convert the RF signal stream into an analog IF signal.

ADC 14 of receiver 8 may, as discussed above, be a multi-channel ADC that is operably coupled to RFFE 12. Each channel of ADC 14 may be associated with a different channel of RFFE 12 to receive an analog IF signal from the associated channel of RFFE 12 and to convert the received analog IF signal into a digital representation of the IF signal.

Preprocessing unit 16 may be configured to perform filtering, declination, and downconversion of the digital representations of IF signals into baseband signals.

Message detection and decoding unit 18 may be configured to perform preamble detection to detect the presence of ADS-B messages within the received data stream. Message detection and decoding unit 18 may also be configured to decode the ADS-B messages detected within the received data stream. For example, message detection and decoding unit 18 may be configured to perform pulse-position modulation (PPM) signal demodulation into binary data and to perform error detection and correction on the demodulated binary data to decode the data content of ADS-B messages (ADS-B data).

Duplicity check unit 22 may be included in DBE 20, may be operably coupled to message detection and decoding unit 18, and may be configured to determine whether two or more of the ADS-B messages decoded and outputted by message detection and decoding unit 18 are identical. In some examples, receiver 8 may receive duplicate ADS-B messages because two or more of antenna elements 4A-4D may receive RF signals that are carrying the same ADS-B message.

Duplicity check unit 22 may deem ADS-B messages to be identical if their parity bits are identical and/or if their data bits are identical. For example, identical ADS-B messages may be identified comparing their parity bits, as the parity bits, obtained by a cyclic redundancy check (CRC) algorithm, may be considered as unique for each ADS-B message. Responsive to determining that two or more ADS-B messages decoded and outputted by message detection and decoding unit 18 are the same ADS-B message, duplicity check unit 22 may output just one ADS-B message out of the two or more identical ADS-B messages. In other words, duplicity check unit 22 may refrain from outputting more than one of two or More of the same ADS-B messages. Aspects of duplicity check unit 22 will be described in further detail below with respect to FIG. 6.

Figure 3:
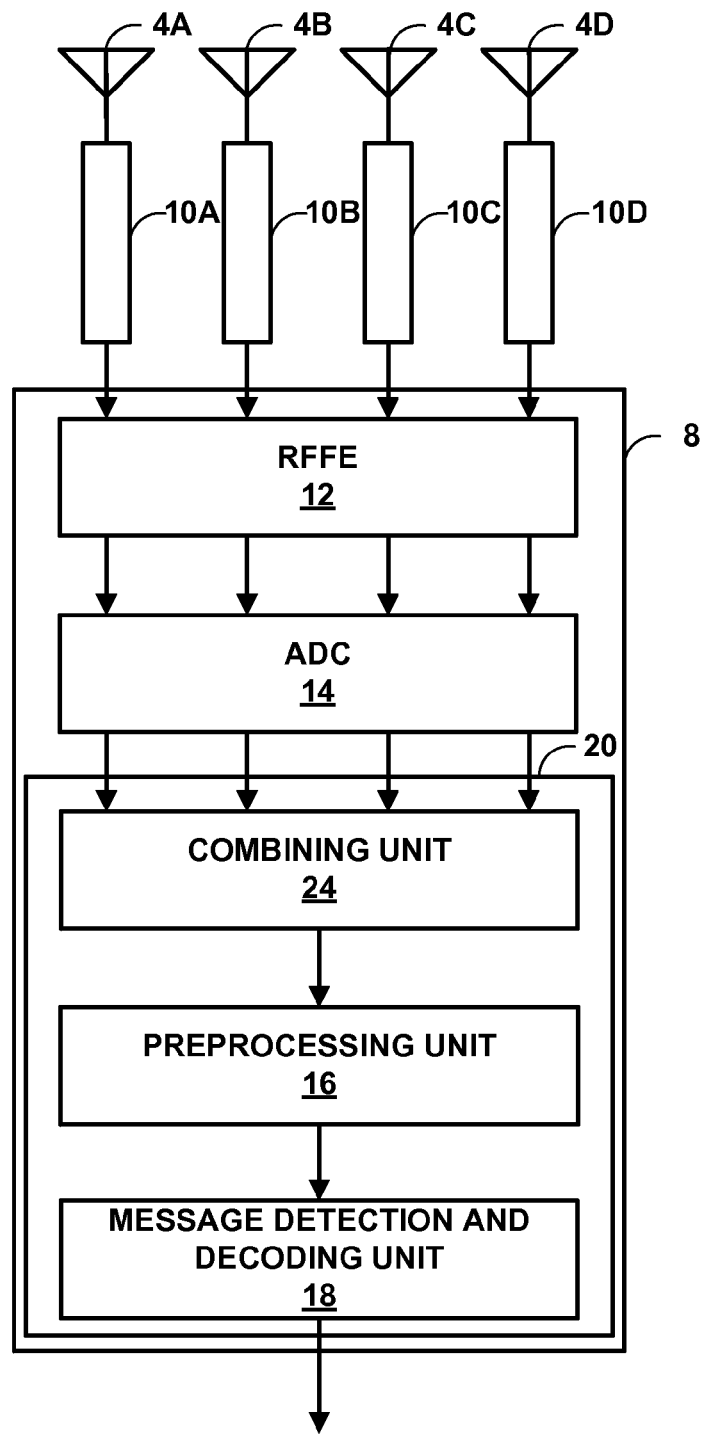
FIG. 3 is a functional block diagram illustrating an example receiver 8 for combining a plurality of signals.
Figure 4:
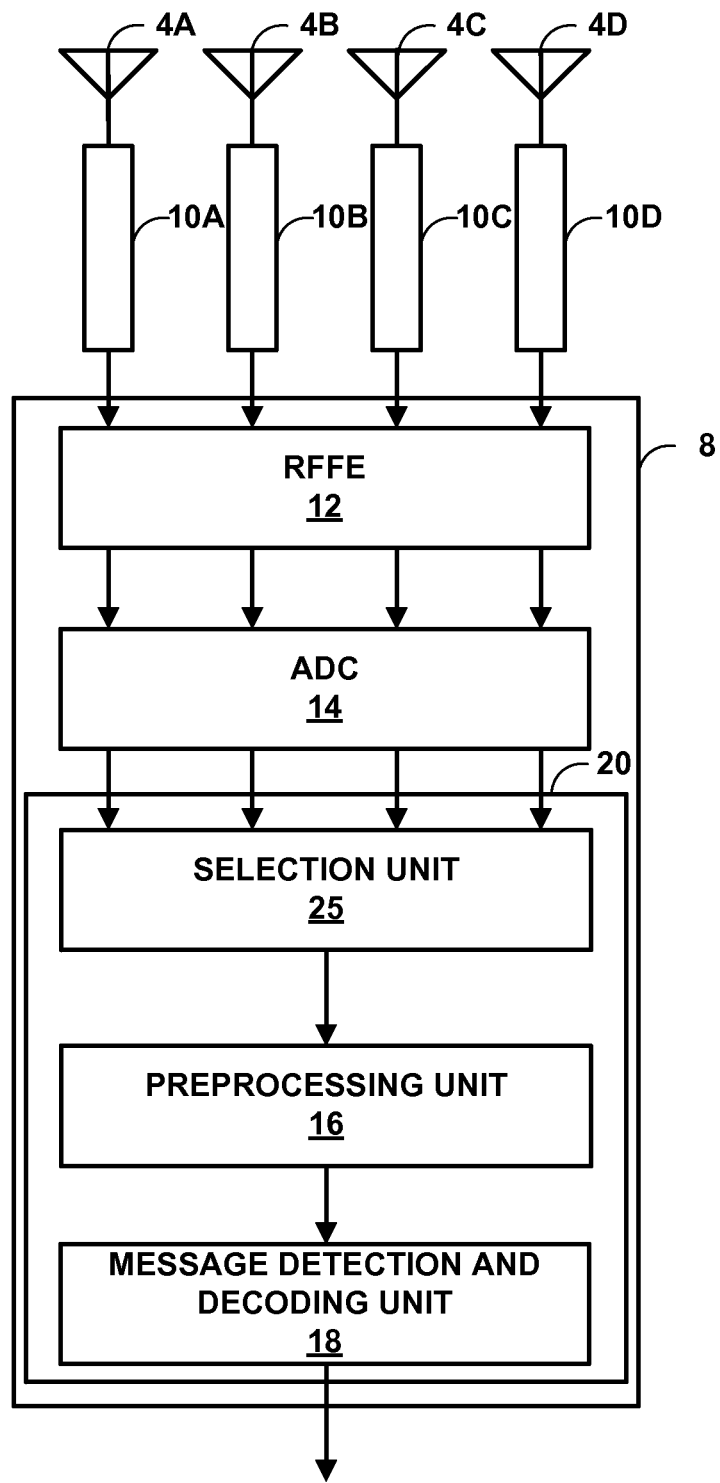
FIG. 4 is a functional block diagram illustrating an example receiver 8 for selecting a single signal to decode.
Figure 5:
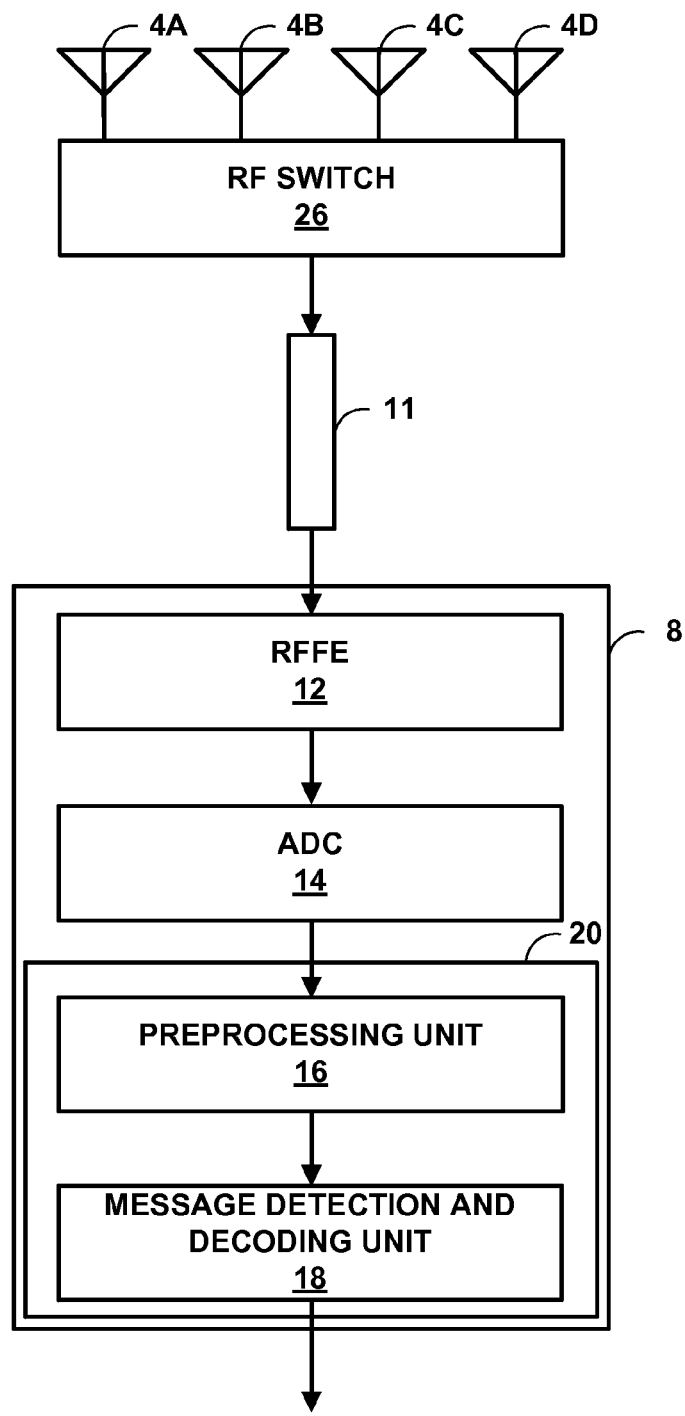
FIG. 5 is a functional block diagram illustrating an example receiver 8 for selecting a signal to process.

The example receiver 8 shown in FIG. 2, where a plurality of messages are decoded in parallel, may be relatively more complex than the examples of receivers shown in FIG. 3, FIG. 4 and FIG. 5, as the example receiver 8 shown in FIG. 2 may utilize multi-channel processing, including multi-channel RFFE 12, multi-channel ADC 14, and multi-channel DBE 20 including an additional duplicity check unit 22.

The traffic computer (not depicted in FIG. 2) of aircraft 2 may process ADS-B data (among other data inputs) outputted by receiver 8 and may output application specific data to a communication bus (not depicted in FIG. 2). For example, traffic computer may output positions of nearby aircraft to a communication bus. That data may be utilized either by an output device, such as a display device, which may be viewed by pilots of aircraft 2, or it may be processed by a software application, such as a collision avoidance application.

FIG. 3 is a functional block diagram illustrating an example receiver 8 for combining a plurality of signals. As shown in FIG. 3, receiver 8 may contain additional combining unit 24. Receiver 8 may include RFFE 12, ADC 14, and DBE 20. DBE 20 may include additional combining unit 24, preprocessing unit 16, and message detection and decoding unit 18.

Receiver 8 may comprise any suitable arrangement of hardware, software, firmware, or any combination thereof, to perform the techniques attributed to receiver 8, RFFE 12, ADC 14, preprocessing unit 16, message detection and decoding unit 18, DBE 20, and combining unit 24 herein. For example, receiver 8 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although RFFE 12, ADC 14, preprocessing unit 16, message detection and decoding unit 18, and combining unit 24 are described as separate modules, in some examples, RFFE 12, ADC 14, preprocessing unit 16, message detection and decoding unit 18, and combining unit 24 can be functionally integrated. For example, preprocessing unit 16, message detection and decoding unit 18, and combining unit 24 may be implemented in the same hardware component. In some examples, RFFE 12, ADC 14, preprocessing unit 16, message detection and decoding unit 18, and combining unit 24 may correspond to individual hardware units, such as ASICs, DSPs, FPGAs, or other hardware units, or one or more common hardware units. In some examples, combining unit 24 may be integrated into DBE 20, preprocessing unit 16, and/or message detection and decoding unit 18.

In the example of FIG. 3, two or more antenna elements of antenna elements 4 may each receive an RF signal that carries the same ADS-B message. For example, two or more antenna elements of antenna elements 4 may each receive the RF signal that may be different for each antenna element of antenna elements 4 due to directional characteristics of individual antenna elements of antenna elements 4. Receiver 8 may combine the representations of the RF signal as received by the two or more antenna elements of antenna elements 4 in order to create a such a combined signal, that the probability of ADS-B message decoding by DBE 20 may be higher compared to the probability of ADS-B message decoding for individual RF signal received by the two or More antenna elements of antenna elements 4.

Antenna elements 4, in some examples, may comprise antenna elements of a TCAS antenna. Each element of antenna elements 4 may be a directional antenna element that corresponds to at least one of a plurality of sectors of a sectorized antenna. Each of antenna elements 4 may be operably coupled to REEF; 12 in receiver 8 via, for example, coaxial cables 10A-10D ("coaxial cables 10") or any other suitable means for connecting antenna elements 4 to RFFE 12.

RFFE 12 of receiver 8 may, as discussed above, be a multi-channel RFFE that is operably coupled to antenna elements 4 via, for example, coaxial cables 10. Each channel of RFFE 12 may be associated with a different antenna element of antenna element 4, and each channel of RFFE 12 may process RF signal received from the associated antenna element of antenna elements 4 and convert it into intermediate frequency (IF) signal. For example, each channel of RFFE 12 may receive one RF signal stream from its associated antenna element of antenna elements 4, process and convert the RF signal stream into an analog IF signal.

As discussed above, two or more antenna elements of antenna elements 4 may each receive an RF signal that carries the same ADS-B message. For example, each of the four antenna elements 4A-4D of FIG. 3 may receive the same RF signal that is carrying the same ADS-B message. However, due to the signal strength, directionality, and other quality considerations of the same RF signal, each of the four analog IF signals outputted by RFFE 12 may not be identical.

ADC 14 of receiver 8 may, as discussed above, be a multi-channel ADC that is operably coupled to RFFE 12. Each channel of ADC 14 may be associated with a different channel of RFFE 12 to receive an analog IF signal from the associated channel of RFFE 12 and to convert the received analog IF signal into a digital representation of the IF signal. As discussed above, each of all analog IF signals outputted by RFFE 12 may not be identical. Similarly, because each of all analog IF signals outputted by RFFE 12 may not be identical, each of the digital representations of the IF signals outputted by ADC 14 may not be identical.

Combining unit 24 may be configured to combine the digital representations of IF signals outputted by ADC 14 into a single digital IF signal that may be processed by single-channel DBE 20. Combining unit 24 may perform a linear combination of each of the digital representations of the IF signals outputted by ADC 14. Combining unit 24 may perform phase compensation on the digital representations of IF signals outputted by ADC 14 to result in a single digital representation of an IF signal. Aspects of combining unit 24 will be described in further detail below with respect to FIG. 7.

Preprocessing unit 16 may be configured to perform filtering, decimation, and downconversion of the digital representation of the IF signal into a baseband signal.

Message detection and decoding unit 18 may be configured to perform preamble detection to detect the presence of ADS-B messages within the baseband signal. Message detection and decoding unit 18 may also be configured to decode the ADS-B messages detected within the baseband signal. For example, message detection and decoding unit 18 may be configured to perform pulse-position modulation (PPM) signal demodulation into binary data and to perform error detection and correction on the demodulated binary data to decode the ADS-B data.

Configuration of receiver 8 shown in FIG. 3 may utilize multi-channel RFFE 12, multi-channel ADC 14, combining unit 24, and single-channel DBE 20. This configuration may be less complex than the one shown in FIG. 2 as it may utilize just single-channel DBE 20 in comparison to the multi-channel DBE shown in FIG. 2.

Traffic computer (not depicted in FIG. 3) of aircraft 2 may process ADS-B data (among other data inputs) outputted by receiver 8 and may output application specific data to a communication bus (not depicted in FIG. 3). For example, traffic computer may output positions of nearby aircraft to a communication bus. That data may be utilized either by an output device, such as a display device, which may be viewed by pilots of aircraft 2, or it may be processed by a software application, such as a collision avoidance application.

FIG. 4 is a functional block diagram illustrating an example receiver 8 for selecting a single signal to decode. As shown in FIG. 4, receiver 8 may include RFFE 12, ADC 14, and DBE 20. DBE 20 may include selection unit 25, preprocessing unit 16, and message detection and decoding unit 18.

Receiver 8 may comprise any suitable arrangement of hardware, software, firmware, or any combination thereof, to perform the techniques attributed to receiver 8, RFFE 12, ADC, 14, preprocessing unit 16, message detection and decoding unit 18, DBE 20, and selection unit 25 herein. For example, receiver 8 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although RFFE 12, ADC 14, preprocessing unit 16, message detection and decoding unit 18, and selection unit 25 are described as separate modules, in some examples, RFFE 12, ADC 14, preprocessing unit 16, message detection and decoding unit 18, and selection unit 25 can be functionally integrated. For example, preprocessing unit 16, message detection and decoding unit 18, and selection unit 25 may be implemented in the same hardware component. In some examples, REEF 12, ADC 14, preprocessing unit 16, message detection and decoding unit 18, and selection unit 25 may correspond to individual hardware units, such as ASICs, DSPs, FPGAs, or other hardware units, or one or more common hardware units.

Antenna elements 4, in some examples, may comprise antenna elements of a TCAS antenna. Each element of antenna elements 4 may be a directional antenna element that corresponds to at least one of a plurality of sectors of a sectorized antenna. Each of antenna elements 4 may be operably coupled to RFFE 12 in receiver 8 via, for example, coaxial cables 10A-10D ("coaxial cables 10") or any other suitable means for connecting antenna elements 4 to RFFE 12.

RFFE 12 of receiver 8 may, as discussed above, be a multi-channel RFFE that is operably coupled to antenna elements 4 via, for example, coaxial cables 10. Each channel of RFFE 12 may be associated with a different antenna element of antenna element 4, and each channel of RFFE 12 may process and convert RF signal stream received from the associated antenna element of antenna elements 4 into intermediate frequency (IF) signal. For example, each channel of RFFE 12 may receive one RF signal stream from its associated antenna element of antenna elements 4, process and convert the associated RE signal stream into an analog IF signal.

ADC 14 of receiver 8 may, as discussed above, be a multi-channel ADC that is operably coupled to RFFE 12. Each channel of ADC 14 may be associated with a different channel of RFFE 12 to receive an analog IF signal from the associated channel of RFFE 12 and to convert the received analog IF signal into a digital representation of the IF signal.

Selection unit 25 may be configured to select one of the digital representations of the IF signals outputted by ADC 14 for further processing by preprocessing unit 16 and message detection and decoding unit 18. For example, selection unit 25 may select the strongest signal (e.g., signal with the highest power level) out of the digital representations of the IF signals outputted by ADC 14. In other examples, selection unit 25 may be integrated into or otherwise be operably coupled to message detection and decoding unit 18 so that selection unit 25 may utilize message detection and decoding unit 18 to determine if the signal selection unit 25 selects signal that includes an ADS-B message. Because antenna elements 4 may receive signals that do not carry ADS-B messages, selection unit 25 may select a signal that does not carry an ADS-B message if selection unit 25 does not also utilize message detection and decoding unit 18 to determine if the signal selection unit 25 selects signal that includes an ADS-B message. If selection unit 25 is integrated into or otherwise be operably coupled to message detection and decoding unit 18, selection unit 25 may be configured to select one of the baseband signals outputted by preprocessing unit 16.

Preprocessing unit 16 may be configured to perform filtering, decimation, and downconversion of the digital representations of IF signals outputted by ADC 14 or selection unit 25 into baseband signals.

Message detection and decoding unit 18 may be configured to perform preamble detection to detect the presence of ADS-B messages within the received data stream. Message detection and decoding unit 18 may also be configured to decode the ADS-B messages detected within the received data stream. For example, message detection and decoding unit 18 may be configured to perform pulse-position modulation (PPM) signal demodulation into binary data and to perform error detection and correction on the demodulated binary data to decode the ADS-B data.

Configuration of receiver 8 shown in FIG. 4 may utilize multi-channel RFFE 12, multi-channel ADC 14, selection unit 25, and single-channel DBE 20.

As discussed above, selection unit 25 may select a single signal that is further processed by single-channel DBE 20. As such, DBE 20 may output a single ADS-B message carried by the selected signal.

Traffic computer (not depicted in FIG. 4) of aircraft 2 may process ADS-B data (among other data inputs) outputted by receiver 8 and may output application specific data to a communication bus (not depicted in FIG. 4). For example, traffic computer may output positions of nearby aircraft to a communication bus. That data may be utilized either by an output device, such as a display device, which may be viewed by pilots of aircraft 2, or it may be processed by a software application, such as a collision avoidance application.

FIG. 5 is a functional block diagram illustrating an example receiver 8 for selecting a RF signal to process. As shown in FIG. 5, receiver 8 may include RF switch 26, RFFE 12, ADC 14, and DBE 20. DBE 20 may include preprocessing unit 16 and message detection and decoding unit 18.

Receiver 8 may comprise any suitable arrangement of hardware, software, firmware, or any combination thereof, to perform the techniques attributed to receiver 8, RF switch 26, RFFE 12, ADC 14, preprocessing unit 16, message detection and decoding unit 18, and DBE 20 herein. For example, receiver 8 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although RE switch 26, RFFE 12, ADC 14, preprocessing unit 16, and message detection and decoding unit 18 are described as separate modules, in some examples, RF switch 26, RFFE 12, ADC 14, preprocessing unit 16, and message detection and decoding unit 18 can be functionally integrated. For example, preprocessing unit 16, and message detection and decoding unit 18 may be implemented in the same hardware component. In some examples, RF switch 26, RFFE 12, ADC 14, preprocessing unit 16, and message detection and decoding unit 18 may correspond to individual hardware units, such as ASICs, DSPs, FPGAs, or other hardware units, or one or more common hardware units.

In the example of FIG. 5, two or more antenna elements of antenna elements 4 may each receive an RIF signal, Antenna elements 4, in some examples, may comprise antenna elements of a TCAS antenna. Each element of antenna elements 4 may be a directional antenna element that corresponds to at least one of a plurality of sectors of a sectorized antenna. Each of antenna elements 4 may be operably coupled to RF switch 26. RF switch 26 may be configured to select one RF signal out of the RF signals received by antenna elements 4. For example, RF switch 26 may select the one RF signal based on the power level of the RF signals (e.g., select the strongest RF signal).

RFFE 12 of receiver 8 may be operably coupled to RF switch 26 via, for example, coaxial cable 11. RFFE 12 may process and convert the RF signal stream received from RF switch 26 into an analog intermediate frequency (IF) signal.

ADC 14 of receiver 8 may be operably coupled to RFFE 12 to receive an analog IF signal from RFFE 12 and to convert the received analog IF signal into a digital representation of the IF signal.

Preprocessing unit 16 may be configured to perform filtering decimation, and downconversion of the digital representation of the IF signal outputted by ADC 14 into a baseband signal.

Message detection and decoding unit 18 may be configured to perform preamble detection to detect the presence of ADS-B messages within the baseband signal. Message detection and decoding unit 18 may also be configured to decode the ADS-B messages detected within the baseband signal. For example, message detection and decoding unit 18 may be configured to perform pulse-position modulation (PPM) signal demodulation into binary data and to perform error detection and correction on the demodulated binary data to decode the ADS-B data.

Configuration of receiver 8 shown in FIG. 5 may utilize RF switch 26, single-channel RFFE 12, single-channel ADC, 14, and single-channel DBE 20. This configuration may be less complex than the one shown in FIG. 4 as the receiver 8 comprises single-channel processing except for RF switch 26.

The traffic computer (not depicted in FIG. 5) of aircraft 2 may process ADS-B data (among other data inputs) outputted by receiver 8 and may output application specific data to a communication bus (not depicted in FIG. 5). For example, traffic computer may output positions of nearby aircraft to a communication bus. That data may be utilized either by an output device, such as a display device, which may be viewed by pilots of aircraft 2, or it may be processed by a software application, such as a collision avoidance application.

Figure 6:
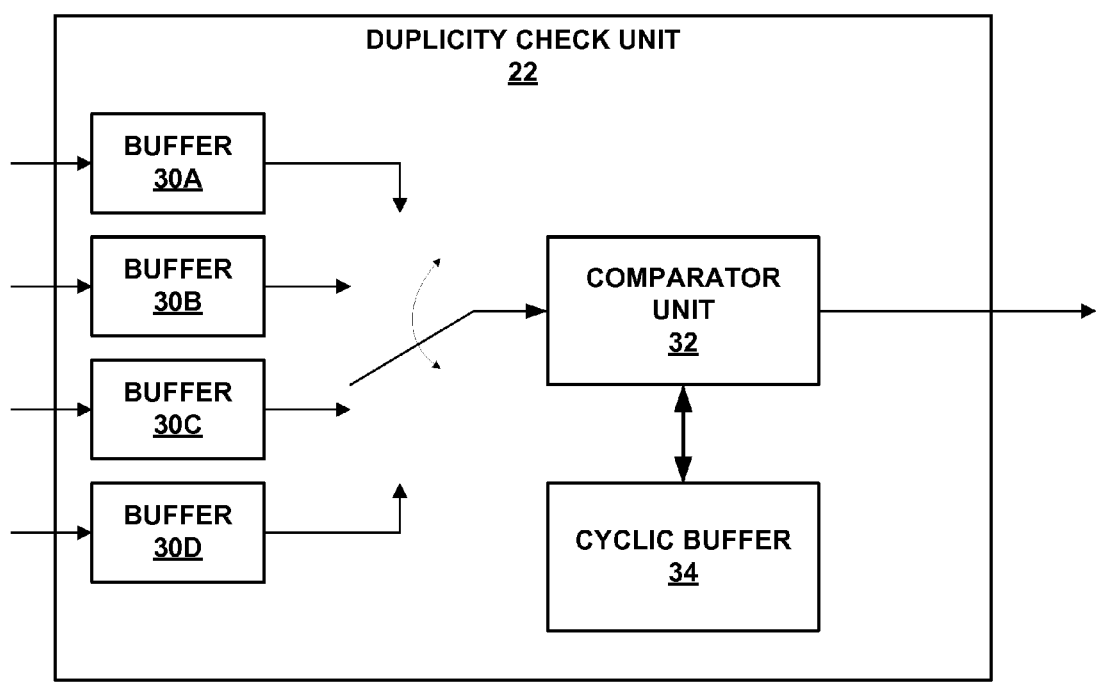
FIG. 6 is a functional block diagram illustrating the duplicity check unit 22 of FIG. 2 in further detail.

FIG. 6 is a functional block diagram illustrating the example duplicity check unit 22 of FIG. 2 in further detail. As shown in FIG. 6, duplicity check unit 22 may include buffers 30A-30D ("buffers 30"), comparator unit 32, and cyclic buffer 34. In an example where components of receiver 8 may process four RF signal streams received from four antenna elements 4A-4D, duplicity check unit 22 may include four buffers 30A-30D to continuously store ADS-B messages data decoded from the corresponding RF signal streams, received by corresponding antenna elements 4A-4D and processed by corresponding channel of multi-channel RFFE 12, ADC 14, and DBE 20.

ADS-B message data decoded by individual channels of DBE 20 may be continuously stored in corresponding buffers 30A-30D. For example, ADS-B message data decoded by the second channel of DBE 20 may be stored in buffer 30B. Comparator unit 32 may periodically load data from all buffers 30A-30D and may compare loaded ADS-B data with all ADS-B data retained in cyclic buffer 34. For 112-bit ADS-B messages, comparator unit 32 may compare the 88-bit data bits, the 24-bit error correction data bits (also known as parity bits), or the entire 112 bits of the ADS-B message. For example, comparator unit 32 may determine that one particular ADS-B message (loaded from buffers 30) is a duplicate of another ADS-B message retained in cyclic buffer 34 if the 24 parity bits of the particular ADS-B message are the same as the 24 parity bits of the another ADS-B message. In another example, comparator unit 32 may determine that one particular ADS-B message (loaded from buffers 30) is a duplicate of another ADS-B message retained in cyclic buffer 34 if the 88-bit data bits of the particular ADS-B message are the same as the 88-bit data bits of the another ADS-B message. In another example, comparator unit 32 may determine that one particular ADS-B message (loaded from buffers 30) is a duplicate of another ADS-B message retained in cyclic buffer 34 if all the 112 bits of the particular ADS-B message are the same as all the 112 bits of the another ADS-B message.

If the ADS-B message data loaded from buffers 30 is not a duplicate of any previous ADS-B messages data retained in cyclic buffer 34, comparator unit 32 may output the ADS-B message data and may also store the ADS-B message data in to cyclic buffer 34. Conversely, if the ADS-B message data loaded from buffers 30 is a duplicate of a previous ADS-B message data retained in cyclic buffer 34, duplicity check unit 22 may refrain from outputting the ADS-B message data that is checked by comparator unit 32. In this way, duplicity check unit 22 may, for a plurality of ADS-B messages decoded by multi-channel DBE 20, determine whether one particular ADS-B message is a duplicate of another ADS-B message, and, in response to determining that one particular ADS-B message is a duplicate of another ADS-B message, refrain from outputting more than one ADS-B message data. The length of cyclic buffer 34 may be adjusted so that a message in the cyclic buffer 34 is not overwritten before there is still a possibility it will be compared to a duplicate message being decoded by individual channels of DBE 20.

Figure 7:
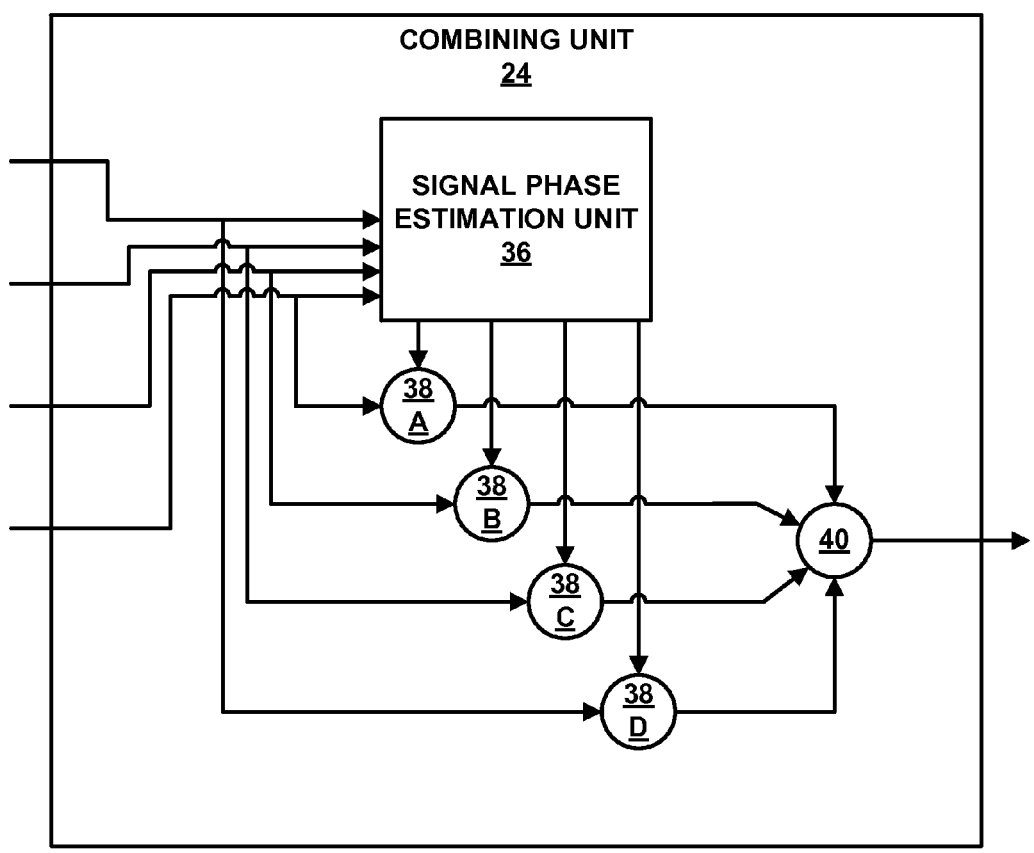
FIG. 7 is a functional block diagram illustrating the combining unit 24 of FIG. 3 in further detail.

FIG. 7 is a functional block diagram illustrating the combining unit 24 of FIG. 3 in further detail. As shown in FIG. 7, combining unit 24 may include signal phase estimation unit 36, multiplier units 38A-38D ("multiplier units 38"), and adder unit 40. As discussed above with respect to FIG. 3, combining unit 24 may be configured to combine the digital representations of IF signals outputted by ADC 14 into a single digital IF signal that may be processed by single-channel DBE 20. Combining unit 24 may perform a linear combination of each of the digital representations of the IF signals outputted by ADC 14. Combining unit 24 may perform phase compensation on the digital representations of IF signals outputted by ADC 14 to result in a single digital representation of an IF signal.

In an example where components of receiver 8 may receive four RF signals from four antenna elements 4A-4D, combining unit 24 may receive as input four digital representations of IF signals outputted by ADC 14. Signal phase estimation unit 36 may, for each of the four signals received by combining unit 24, determine a combining coefficient, such as via a proper method. Because the four signals may each carry the same ADS-B message but are out of phase with respect to each other, signal phase estimation unit 36 may determine a combining coefficient for each of the four signals that compensates for the phase differences between each of the four signals. Each signal may be multiplied with its combining coefficient via multiplier units 38 to result in signals that are in phase with each other. The in-phase signals may be added together via adder unit 40 to result in a digital representation of a combined IF signal that may be further processed by DBE 20.

Figure 8:
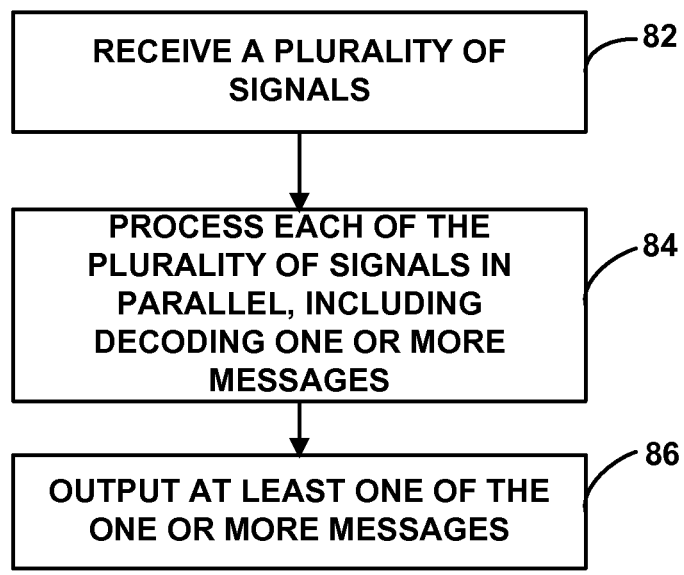
FIG. 8 is a flow diagram illustrating an example technique for receiving and decoding messages according to aspects of the present disclosure.

FIG. 8 is a flow diagram illustrating an example technique for receiving and decoding ADS-B messages according to aspects of the present disclosure. While FIG. 8 is described with respect to antenna elements 4 and receiver 8, in other examples, the technique shown in FIG. 8 can be implemented by any other suitable systems or components alone or in combination with antenna elements 4 and receiver 8.

In accordance with the technique shown in FIG. 8, a plurality of antenna elements 4 may receive a plurality of signals, wherein each of the plurality of antenna elements 4 may correspond to at least one of a plurality of sectors of a sectorized antenna (82). Receiver 8 may process each of the plurality of signals in parallel, including decoding one or more messages from the plurality of signals (84). Receiver 8 may output at least one of the one or more messages (86).

In some examples, receiver 8 processing one or more of the plurality of signals may include receiver 8 processing each of the plurality of signals in parallel. In some examples, receiver 8 processing one or more of the plurality of signals may include receiver 8 processing each of the plurality of signals to decode a plurality of messages from the plurality of signals. In some examples, duplicity check unit 22 may determine whether a one particular message of the plurality of messages is a duplicate of another message of the plurality of messages. Duplicity check unit 22 may, in response to determining that the particular message is a duplicate of another message, refrain from outputting more than one instance of ADS-B message data.

In some examples, receiver 8 processing one or more of the plurality of signals may include receiver 8 combining the plurality of signals to result in a combined signal and decoding a message from the combined signal. In some examples, receiver 8 outputting the one or more messages may include receiver 8 outputting the message.

In some examples, receiver 8 processing one or more of the plurality of signals may include receiver 8 selecting one of the plurality of signals and decoding a message from the selected one of the plurality of signals. In some examples, receiver 8 outputting the one or more messages may include receiver 8 outputting the message.

In some examples, the plurality of antenna elements 4 comprises antenna elements of a traffic collision avoidance system (TCAS) antenna. In some examples, receiver 8 comprises a TCAS computer. In some examples, the one or more messages comprise one or more automatic dependent surveillance-broadcast (ADS-B) messages.

The techniques of this disclosure may be implemented in a wide variety of devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

FIGS. 1B, 2, 3, 4, 5 depict examples of some possible implementations. However, various combinations of these example implementations are also possible as well as additional implementations not described herein that also utilize techniques involving sectorized antennas described herein.

The techniques of this disclosure may also be utilized for improved reception of several surveillance signals, and may not be limited to the examples described herein regarding the improved reception of ADS-B signals.

Various examples have been described. These and other examples are within the scope of the following claims.

What is claimed is:

1. A method comprising:
    receiving, by a plurality of antenna elements of a traffic collision avoidance system (TCAS) antenna, a plurality of signals carrying a plurality of automatic dependent surveillance-broadcast (ADS-B) messages and one or more signals that do not carry ADS-B messages, wherein each of the plurality of antenna elements correspond to at least one of a plurality of sectors of a sectorized antenna;
    converting, by a multi-channel radio frequency front end (RFFE) of a receiver in a TCAS unit, the plurality of signals to a plurality of intermediate frequency signals in parallel;
    converting, by one or more analog to digital converters of the receiver, the plurality of intermediate frequency signals to a plurality of digital signals;
    processing, by a multi-channel digital back-end of the receiver in the TCAS unit, each of the plurality of digital signals in parallel, including detecting which of the plurality of digital signals carry the plurality of ADS-B messages and decoding the plurality of ADS-B messages from the plurality of digital signals in parallel, wherein the plurality of ADS-B messages indicate at least positions of one or more other neighboring aircraft; and
    outputting, by the receiver in the TCAS unit, at least one of the plurality of ADS-B messages.

2. The method of claim 1, further comprising:
    determining whether a particular ADS-B message of the plurality of ADS-B messages is a duplicate of other ADS-B messages of the plurality of ADS-B messages; and
    in response to determining that the particular message is a duplicate of another ADS-B message, refrain from outputting more than one instance of ADS-B messages of the particular ADS-B message.

3. The method of claim 1,
    wherein processing each of the plurality of signals comprises:
        combining the plurality of digital signals to result in a combined signal;
        decoding an ADS-B message from the combined signal; and
    wherein outputting the at least one of the plurality of ADS-B messages comprises outputting the decoded ADS-B message.

4. A system comprising:
    a plurality of antenna elements of a traffic collision avoidance system (TCAS) antenna configured to receive a plurality of signals carrying a plurality of automatic dependent surveillance-broadcast (ADS-B) messages and one or more signals that do not carry ADS-B messages, wherein each of the plurality of antenna elements correspond to at least one of a plurality of sectors of a sectorized antenna;
    a receiver comprising:
        a multi-channel radio frequency front end (RFFE) configured to convert the plurality of signals to a plurality of intermediate frequency signals in parallel;
        one or more analog to digital converters configured to convert the plurality of intermediate frequency signals to a plurality of digital signals; and
        a multi-channel digital back-end of the receiver configured to process each of the plurality of digital signals in parallel, including detecting which of the plurality of digital signals carry the plurality of ADS-B messages and decoding the plurality of ADS-B messages from the plurality of digital signals in parallel, wherein the plurality of ADS-B messages indicate at least positions of one or more other neighboring aircraft; and
    wherein the receiver (8) is further configured to output at least one of the plurality of ADS-B messages.

5. The system of claim 4, further comprising:
    a duplicity check unit configured to:
        determine whether a particular ADS-B message of the plurality of ADS-B messages is a duplicate of other ADS-B messages of the plurality of ADS-B messages; and
        in response to determining that the particular ADS-B message is a duplicate of another ADS-B message, refrain from outputting more than one instance of ADS-B messages of the particular ADS-B message.

6. The system of claim 4, wherein the receiver is further configured to: combine the plurality of digital signals to result in a combined signal;
    decode a single ADS-B message from the combined signal; and
    output the single ADS-B message.

* * * * *